(12) United States Patent
Suzuki et al.

(10) Patent No.: US 7,440,019 B2
(45) Date of Patent: Oct. 21, 2008

(54) SOLID-STATE IMAGE PICK-UP DEVICE

(75) Inventors: Nobuo Suzuki, Miyagi (JP); Kazuyuki Masukane, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 821 days.

(21) Appl. No.: 10/620,459

(22) Filed: Jul. 17, 2003

(65) Prior Publication Data

US 2004/0017497 A1    Jan. 29, 2004

(30) Foreign Application Priority Data

Jul. 19, 2002  (JP) .................. 2002-210562

(51) Int. Cl.
*H04N 5/335* (2006.01)

(52) U.S. Cl. ............ 348/315; 348/230.1; 348/275; 348/312; 348/317; 348/320; 348/322; 257/246; 257/249

(58) Field of Classification Search .......... 348/230.1, 348/275, 311, 312, 315, 317, 320, 322; 257/246, 257/249

See application file for complete search history.

(56) References Cited

U.S. PATENT DOCUMENTS

| | | | | |
|---|---|---|---|---|
| 4,012,587 A * | 3/1977 | Ochi et al. | .................. | 348/315 |
| 4,242,700 A * | 12/1980 | Weimer | .................. | 348/275 |
| 4,336,556 A * | 6/1982 | Sekine et al. | .................. | 348/319 |
| 4,455,575 A * | 6/1984 | Murakoshi | .................. | 348/322 |
| 4,514,766 A * | 4/1985 | Koike et al. | .................. | 348/322 |
| 4,602,289 A * | 7/1986 | Sekine | .................. | 348/315 |
| 4,810,901 A * | 3/1989 | Yamada | .................. | 327/515 |
| 5,051,832 A * | 9/1991 | Losee et al. | .................. | 348/220.1 |
| 5,274,476 A * | 12/1993 | Lee | .................. | 358/483 |
| 5,283,451 A * | 2/1994 | Cazaux | .................. | 257/229 |
| 5,306,906 A * | 4/1994 | Aoki et al. | .................. | 250/208.1 |
| 6,211,915 B1 * | 4/2001 | Harada | .................. | 348/298 |
| 6,236,434 B1 * | 5/2001 | Yamada | .................. | 348/315 |
| 6,583,818 B1 * | 6/2003 | Toma | .................. | 348/312 |
| 6,690,421 B1 * | 2/2004 | Yamada et al. | .................. | 348/272 |
| 6,760,071 B1 * | 7/2004 | Chen et al. | .................. | 348/311 |
| 6,831,692 B1 | 12/2004 | Oda | | |
| 6,885,402 B1 * | 4/2005 | Misawa | .................. | 348/315 |

FOREIGN PATENT DOCUMENTS

| | | |
|---|---|---|
| JP | 2000-125209 A | 4/2000 |
| JP | 2000-125311 A | 4/2000 |
| JP | 2001-8104 A | 1/2001 |

* cited by examiner

*Primary Examiner*—Lin Ye
*Assistant Examiner*—Chriss S Yoder, III
(74) *Attorney, Agent, or Firm*—Birch, Stewart, Kolasch & Birch, LLP (57) ABSTRACT

A plurality of low-sensitivity pixels 10 and a plurality of high-sensitivity pixels 20 are arranged like a tetragonal grid respectively, and are provided in positions shifted by ½ of an array pitch from each other in a row direction X and a column direction Y. The detected charges of the low-sensitivity pixel 10 and the high-sensitivity pixel 20 are transferred in the column direction Y by a vertical transfer section 31. The charges of the low-sensitivity pixel 10 and the high-sensitivity pixel 20 which are adjacent to each other in the column direction are transferred through the vertical transfer sections 31 which are different from each other.

7 Claims, 3 Drawing Sheets

SOLID-STATE IMAGE PICK-UP DEVICE

BACKGROUND OF THE INVENTION

1. Field of the Invention

The present invention relates to a solid-state image pick-up device comprising a plurality of photoelectric converting devices provided in a row direction and a column direction orthogonal thereto over the surface of a semiconductor substrate, and more particularly to a solid-state image pick-up device comprising a photoelectric converting device having a relatively high sensitivity and a photoelectric converting device having a relatively low sensitivity.

2. Description of the Related Art

A solid-state image pick-up device to be utilized in a digital camera detects a charge corresponding to an image signal by means of a photoelectric converting device. In general, therefore, it is hard to increase a dynamic range. Therefore, there has been employed a processing of continuously carrying out high-sensitivity image-capturing and low-sensitivity image-capturing in a short time and synthesizing two images thus acquired in order to obtain an image having a wide dynamic range. However, the two images to be synthesized are not obtained at the same time. For this reason, there is a problem in that an unnatural image is picked up if an object having a motion is photographed.

Figure 3:
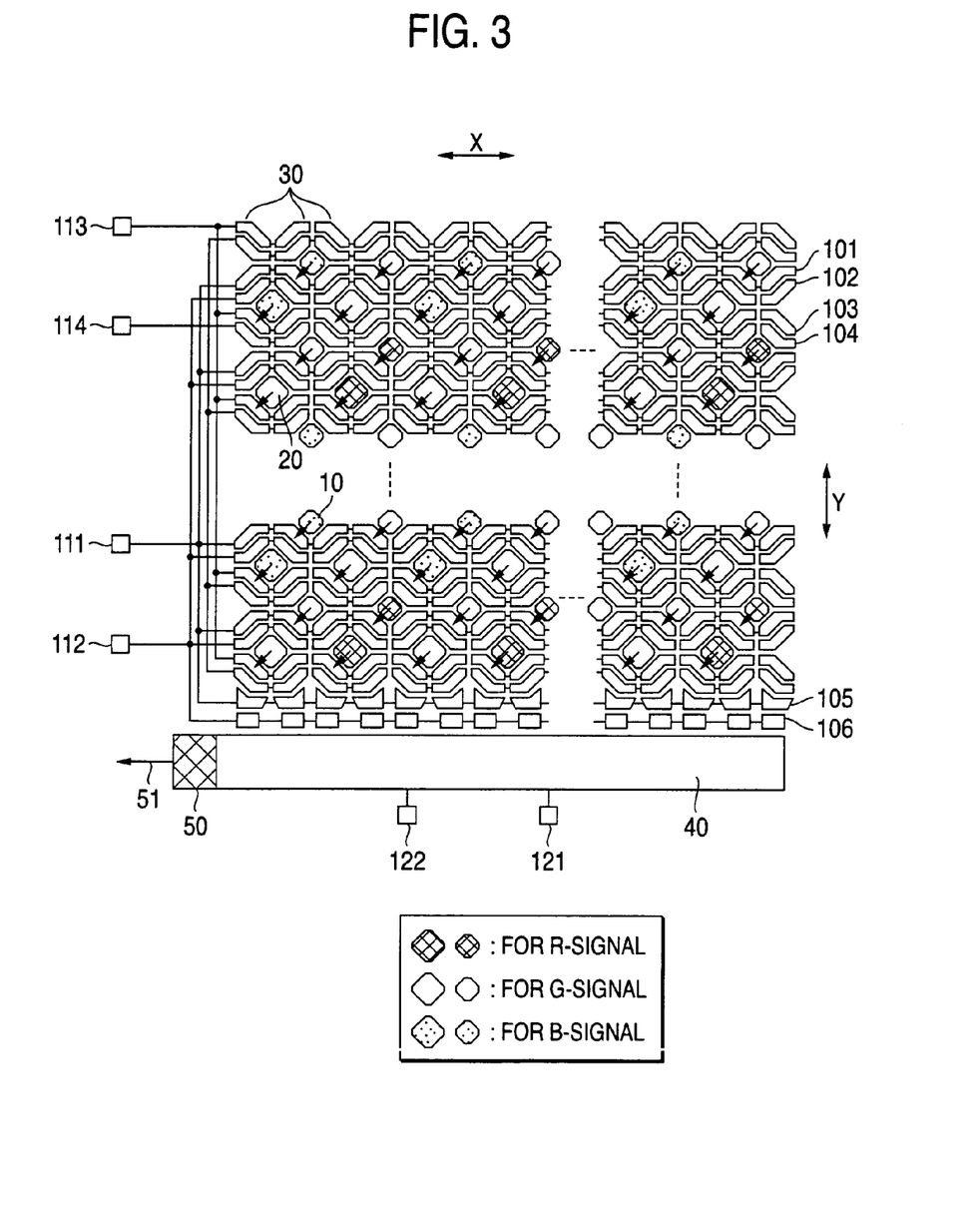
FIG. 3 is a view showing the schematic structure of a conventional solid-state image pick-up device.

As another solving means, there is utilized a solid-state image pick-up device including a photoelectric converting device having a relatively high sensitivity (which will be hereinafter referred to as a "high-sensitivity pixel" in some cases) and a photoelectric converting device having a relatively low sensitivity (which will be hereinafter referred to as a "low-sensitivity pixel" in some cases). FIG. 3 is a view showing the schematic structure of a solid-state image pick-up device having a so-called honeycomb structure, that is, a solid-state image pick-up device comprising a photoelectric converting device having a high sensitivity and a photoelectric converting device having a low sensitivity.

The solid-state image pick-up device shown in FIG. 3 serves to convert a light intensity into a charge signal by a plurality of low-sensitivity pixels 10 and a plurality of high-sensitivity pixels 20, to transfer a signal charge to an output section 50 through a plurality of vertical transfer sections 30 (only a part thereof has the designation in FIG. 3) and a horizontal transfer section 40, and to output a voltage signal 51 corresponding to the signal charge from the output section 50.

The low-sensitivity pixel 10 and the high-sensitivity pixel 20 (only a part thereof has designations in FIG. 3) are arranged like a tetragonal grid in a row direction X and a column direction Y orthogonal thereto. The array pitch of the low-sensitivity pixel 10 is equal to that of the high-sensitivity pixel 20, and the low-sensitivity pixel 10 and the high-sensitivity pixel 20 are arranged in positions shifted by ½ of an array pitch from each other in the row direction X and the column direction Y. In order to change the sensitivity of the photoelectric converting device such as a photodiode constituting the low-sensitivity pixel 10 and the high-sensitivity pixel 20, the area of the light receiving plane of the photoelectric converting device may be varied or a collecting area may be varied by means of a microlens provided above the photoelectric converting device. Since all these methods are well-known, description will be omitted.

Moreover, the solid-state image pick-up device in FIG. 3 has a color filter (not shown) above the low-sensitivity pixel 10 and the high-sensitivity pixel 20 in order to detect a color image signal. While a method of arranging the color filter is optional, it is preferable that the array of the low-sensitivity pixel 10 should be identical to that of the high-sensitivity pixel 20 in order to obtain an image having a wide dynamic range. In FIG. 3, the color filter has a Bayer array and the corresponding photoelectric converting devices detect charges corresponding to red, green and blue lights, respectively. In some cases, signals corresponding to the red, green and blue lights which are detected by the high-sensitivity pixel 20 will be referred to as R, G and B signals (or simply R, G and B) and signals corresponding to the red, green and blue colors which are detected by the low-sensitivity pixel 10 will be referred to as r, g and b signals (or simply r, g and b).

The vertical transfer section 30 serves to transfer charges from the low-sensitivity pixel 10 and the high-sensitivity pixel 20 in the column direction Y and includes a plurality of vertical transfer channels (not shown) formed on a semiconductor substrate, a plurality of vertical transfer electrodes 101 to 104 formed to cross each of the vertical transfer channels as seen on a plane, and a charge reading region for reading the charges of the low-sensitivity pixel 10 and the high-sensitivity pixel 20 onto the vertical transfer channels (which are typically shown in an arrow of FIG. 3).

The vertical transfer channels take a winding shape extended wholly in the column direction Y between the low-sensitivity pixel 10 and the high-sensitivity pixel 20, and a region for storing and receiving the charge is partitioned by the vertical transfer electrodes 101 to 104 formed above the vertical transfer channels. The four vertical transfer electrodes 101 to 104 are provided corresponding to the low-sensitivity pixel 10 and the high-sensitivity pixel 20 respectively (any of them which corresponds to the high-sensitivity pixels for one row has the designation in the drawing) and take a winding shape extended wholly in the row direction X between the low-sensitivity pixel 10 and the high-sensitivity pixel 20. While the shapes of the region partition for storing and receiving the charges are connected in FIG. 3, the region is actually formed by conductors having almost equal widths.

Vertical transfer pulses having four phases are applied to the vertical transfer electrodes 101 to 104 through terminals 111 to 114 and the charges of the vertical transfer channels are transferred in the column direction Y. The vertical transfer pulse is also applied to transfer electrodes 105 and 106 between the vertical transfer section 30 and the horizontal transfer section 40, and the charges detected by the low-sensitivity pixel 10 and the high-sensitivity pixel 20 for one row are sent to the horizontal transfer section 40 every cycle of the vertical transfer pulse. The reading operation from the low-sensitivity pixel 10 and the high-sensitivity pixel 20 to the vertical transfer channel is carried out by superposing a reading pulse on a first phase pulse to be applied immediately after the start of vertical charge transfer (a vertical transfer pulse to be applied to the terminal 111) and a third phase pulse (a vertical transfer pulse to be applied to the terminal 113).

A channel stopper is formed between the vertical transfer channels, which is not shown in FIG. 3. Moreover, while the vertical transfer electrodes 101 to 104 are shown to be larger than the low-sensitivity pixel 10 and the high-sensitivity pixel 20 in FIG. 3, they are actually smaller.

The horizontal transfer section 40 serves to transfer a charge from the vertical transfer section 30 in the row direction X and includes a horizontal transfer channel and a horizontal transfer electrode (which are not shown). Horizontal transfer pulses having two phases are applied to the horizontal transfer electrode through terminals 121 and 122 and the signal charges of the low-sensitivity pixel 10 for one row and the high-sensitivity pixel 20 for one row which are sent from the vertical transfer section 30 are transferred to the output section 50.

Next, description will be given to the driving operation of the solid-state image pick-up device shown in FIG. 3. Charges stored in the low-sensitivity pixel 10 and the high-sensitivity pixel 20 corresponding to the intensity of a light incident from a field are read onto the vertical transfer channel in response to the reading pulse to be superposed on the first and third phase vertical transfer pulses. Then, the charges are transferred in the vertical transfer channel in response to the vertical transfer pulse and are held in the predetermined region of the horizontal transfer channel. Subsequently, when the horizontal transfer pulse is applied, the held charges are sequentially sent to the output section 50 and the voltage signal 51 corresponding to the amount of the charges is output.

As described above, in the conventional solid-state image pick-up device shown in FIG. 3, a high-sensitivity pixel signal and a low-sensitivity pixel signal are alternately output from the horizontal transfer section. Therefore, it is possible to generate an image signal having a wide dynamic range. For example, in FIG. 3, output is carried out in order of "GgRrG-gRrGgRr . . . GgRr" in the horizontal transfer of an initial stage and is carried out in order of "BbGgBbGgBbGg . . . BbGg" in the horizontal transfer of a next stage.

Only in the case in which a static image to be recorded is photographed, however, both the high-sensitivity pixel signal and the low-sensitivity pixel signal are required to obtain an image signal having a wide dynamic range. In the image-capturing of a dynamic image and the creation of an image for the view finder display of a camera, generally, only the high-sensitivity pixel signal is enough. Accordingly, it is necessary to carry out a useless processing, for example, the separation of the low-sensitivity pixel signal and the high-sensitivity pixel signal which are alternately output. Consequently, a processing time is increased. Moreover, an unnecessary signal charge is transferred so that an increase in power consumption cannot be ignored.

The signal charge is dividedly read twice for the high-sensitivity pixel signal and the low-sensitivity pixel signal. In the case in which the low-sensitivity pixel signal is not required, it can also be omitted. In the case in which the low-sensitivity pixel signal is required, the reading operation is dividedly carried out twice even if a one-time reading operation is originally enough. Consequently, the processing time is increased. There has also been proposed a solid-state image pick-up device described in JP-A-2001-8104 in which two transfer paths for a high-sensitivity pixel and a low-sensitivity pixel are provided in a horizontal transfer section. However, the number of peripheral elements such as an AD converter is increased, and furthermore, an increase in power consumption cannot be avoided.

Moreover, it is necessary to maintain a region in which a vertical transfer section is to be formed depending on an amount of charge transfer which is supposed. In the case in which the arrangement shown in FIG. 3 is employed, a region to which the detected charge of the low-sensitivity pixel is to be transferred also occupies the same region as that for the high-sensitivity pixel. For this reason, an unnecessary region is to be maintained so that an increase in the density of an image pick-up device is disturbed.

SUMMARY OF THE INVENTION

The invention has been made in consideration of the circumstances and has an object to provide a solid-state image pick-up device capable of efficiently arranging and utilizing a high-sensitivity pixel and a low-sensitivity pixel.

The invention provides a solid-state image pick-up device having a plurality of photoelectric converting devices arranged in a row direction and a column direction orthogonal thereto over a surface of a semiconductor substrate, comprising a vertical transfer section for transferring a charge from the photoelectric converting device in the column direction, a horizontal transfer section for transferring a charge from the vertical transfer section in the row direction, and an output section for outputting a signal corresponding to a charge transferred through the horizontal transfer section, wherein the photoelectric converting device includes a plurality of high-sensitivity photoelectric converting devices arranged like a tetragonal grid in the row direction and the column direction orthogonal thereto and serving to carry out a photoelectric conversion having a relatively high sensitivity, and a plurality of low-sensitivity photoelectric converting devices arranged like the tetragonal grid in the row direction and the column direction orthogonal thereto and serving to carry out a photoelectric conversion having a relatively low sensitivity, the high-sensitivity photoelectric converting device and the low-sensitivity photoelectric converting device are arranged at an equal array pitch in positions shifted by ½ of the array pitch from each other in the row direction and the column direction, the vertical transfer section includes a plurality of vertical transfer channels formed on the semiconductor substrate corresponding to the photoelectric converting devices provided in the column direction, a plurality of vertical transfer electrodes formed to cross each of the vertical transfer channels as seen on a plane, and a charge reading region for reading a charge of the photoelectric converting device onto the vertical transfer channels, the vertical transfer channel takes a winding shape extended wholly in the column direction between the photoelectric converting devices, the vertical transfer electrode takes a winding shape extended wholly in the row direction between the photoelectric converting devices, and, the charge reading regions of the photoelectric converting devices which are adjacent to each other in the column direction are formed between the vertical transfer channels which are different from each other.

According to the invention, the charges of the photoelectric converting devices which are adjacent to each other in the column direction are transferred through the different vertical transfer channels. Consequently, the charges of the high-sensitivity pixels for two rows or the charges of the low-sensitivity pixels for two rows can be transferred to the horizontal transfer section at the same time. Even if the operation for reading a charge is dividedly carried out twice, accordingly, a processing time is not increased and the operation for reading only the charge of the high-sensitivity pixel can be carried out in a shorter time. Moreover, a charge transfer channel for one pixel can be arranged in a region for two pixels in the column direction. Consequently, the width of the charge transfer channel can be reduced so that a density can be increased.

In the solid-state image pick-up device according to the invention, four vertical transfer electrodes are provided corresponding to one photoelectric converting device and are driven by vertical transfer pulses having eight phases together with the four vertical transfer electrodes corresponding to other photoelectric converting devices which are adjacent to each other in the column direction.

In the solid-state image pick-up device according to the invention, moreover, two vertical transfer electrodes are provided corresponding to one photoelectric converting device and are driven by vertical transfer pulses having four phases together with the two vertical transfer electrodes corresponding to other photoelectric converting devices which are adjacent to each other in the column direction.

The invention provides a solid-state image pick-up device having a plurality of photoelectric converting devices arranged in a row direction and a column direction orthogonal thereto over a surface of a semiconductor substrate, comprising a vertical transfer section for transferring a charge from the photoelectric converting device in the column direction, a horizontal transfer section for transferring a charge from the vertical transfer section in the row direction, and an output section for outputting a signal corresponding to a charge transferred through the horizontal transfer section, wherein the photoelectric converting device includes a plurality of high-sensitivity photoelectric converting devices arranged like a tetragonal grid in the row direction and the column direction orthogonal thereto and serving to carry out a photoelectric conversion having a relatively high sensitivity, and a plurality of low-sensitivity photoelectric converting devices arranged like the tetragonal grid in the row direction and the column direction orthogonal thereto and serving to carry out a photoelectric conversion having a relatively low sensitivity, the high-sensitivity photoelectric converting device and the low-sensitivity photoelectric converting device are arranged at an equal array pitch in positions shifted by ½ of the array pitch from each other in the row direction and the column direction, the vertical transfer section includes a plurality of vertical transfer channels formed on the semiconductor substrate corresponding to the photoelectric converting devices provided in the column direction, a plurality of vertical transfer electrodes formed to cross each of the vertical transfer channels as seen on a plane, and a charge reading region for reading a charge of the photoelectric converting device onto the vertical transfer channels, the vertical transfer channel takes such a shape as to connect two winding shapes extended wholly in the column direction between the photoelectric converting devices, the vertical transfer electrode takes a winding shape extended wholly in the row direction between the photoelectric converting devices, and the respective vertical transfer channels are shared for the transfer of the charges from the high-sensitivity photoelectric converting devices for one column and the transfer of the charges from the low-sensitivity photoelectric converting devices for one column which is adjacent thereto.

DESCRIPTION OF THE PREFERRED EMBODIMENTS

First Embodiment

Figure 1:
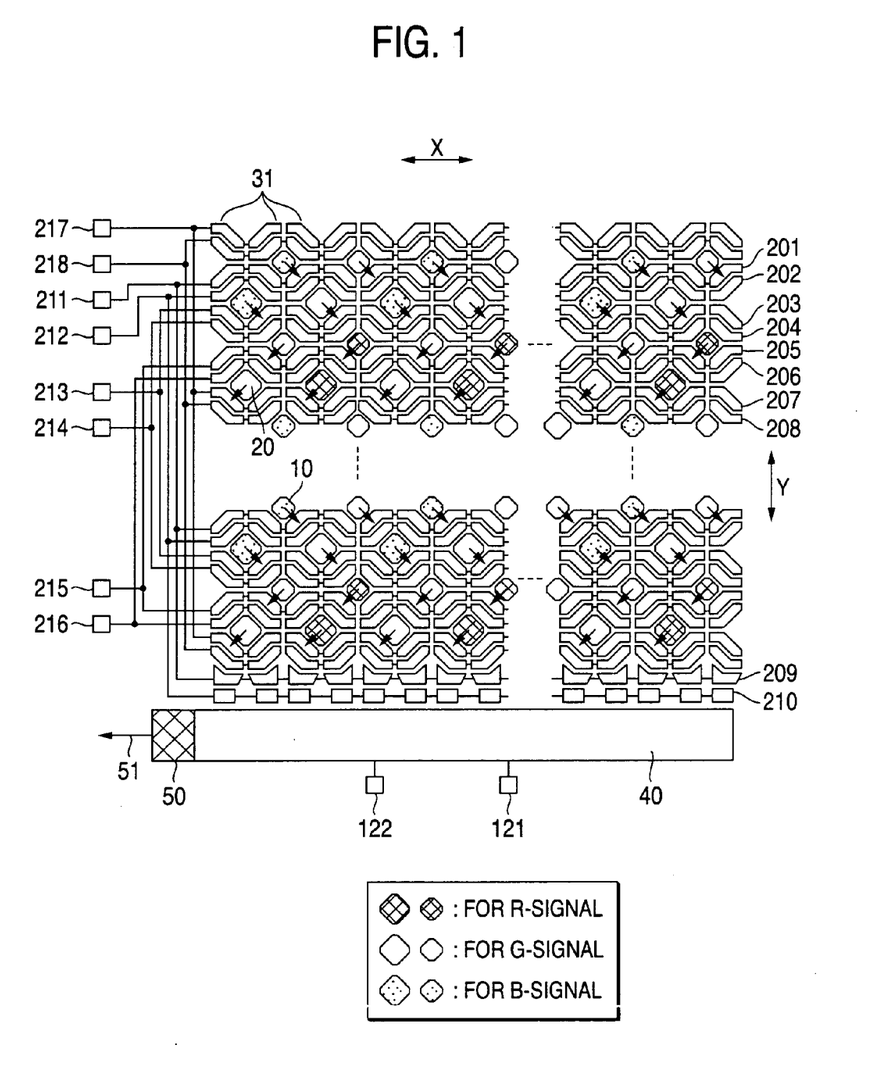
FIG. 1 is a view showing the schematic structure of a solid-state image pick-up device according to a first embodiment.

FIG. 1 shows the schematic structure of a solid-state image pick-up device according to a first embodiment. Since the structures of a plurality of low-sensitivity pixels 10, a plurality of high-sensitivity pixels 20, a horizontal transfer section 40 and an output section 50 in the solid-state image pick-up device of FIG. 1 are the same as those of the solid-state image pick-up device in FIG. 3, description will be omitted.

A vertical transfer section 31 (only a part has the designation in FIG. 1) serves to transfer charges from the low-sensitivity pixel 10 and the high-sensitivity pixel 20 in a column direction Y and includes a plurality of vertical transfer channels (not shown) formed on a semiconductor substrate, a plurality of vertical transfer electrodes 201 to 208 formed to cross each of the vertical transfer channels as seen on a plane, and a charge reading region for reading the charges of the low-sensitivity pixel 10 and the high-sensitivity pixel 20 onto the vertical transfer channels (which are typically shown in an arrow of FIG. 1).

The vertical transfer channels take a winding shape extended wholly in the column direction Y between the low-sensitivity pixel 10 and the high-sensitivity pixel 20 and a region for storing and receiving the charge is partitioned by the vertical transfer electrodes 201 to 208 formed above the vertical transfer channels. The eight vertical transfer electrodes 201 to 208 are provided corresponding to the low-sensitivity pixel 10 and the high-sensitivity pixel 20 which are adjacent to each other in a column direction Y respectively (only any of them which corresponds to the high-sensitivity pixels for two rows has the designation in the drawing) and take a winding shape extended wholly in the row direction X between the low-sensitivity pixel 10 and the high-sensitivity pixel 20 in the same manner as the vertical transfer electrodes 101 to 104 in FIG. 3. Moreover, they are the same as the vertical transfer electrodes 101 to 104 in FIG. 3 in that they are actually formed by conductors having almost equal widths.

Vertical transfer pulses having eight phases are applied to the vertical transfer electrodes 201 to 208 through terminals 211 to 218 and the charges of the vertical transfer channels are transferred in the column direction Y. The vertical transfer pulse is also applied to transfer electrodes 209 and 210 between a vertical transfer section 30 and the horizontal transfer section 40, and the charges detected by the low-sensitivity pixel 10 or the high-sensitivity pixel 20 for two rows are sent to the horizontal transfer section 40 every cycle of the vertical transfer pulse. The operation for reading the charge onto the vertical transfer channel is carried out separately for reading from the low-sensitivity pixel 10 and reading from the high-sensitivity pixel 20. The operation for reading the charge from the low-sensitivity pixel 10 is carried out by superposing a reading pulse on a first phase pulse to be applied immediately after the start of vertical charge transfer (a vertical transfer pulse to be applied to the terminal 211) and a fifth phase pulse (a vertical transfer pulse to be applied to the terminal 215). Moreover, the operation for reading the charge from the high-sensitivity pixel 20 is carried out by superposing a reading pulse on a third phase pulse to be applied immediately after the start of vertical charge transfer (a vertical transfer pulse to be applied to the terminal 213) and a seventh phase pulse (a vertical transfer pulse to be applied to the terminal 217).

A charge reading region for reading the charge of the low-sensitivity pixel 10 onto the vertical transfer channel is formed between the different vertical transfer channels from each other in the two low-sensitivity pixels 10 which are adjacent to each other in the column direction. For the reading operation in the application of the first phase pulse to the terminal 211, the charge is read onto the vertical transfer channel on the right side of the low-sensitivity pixel 10 as shown in the drawing. For the reading operation in the application of the fifth phase pulse to the terminal 215, the charge is read onto the vertical transfer channel on the left side of the low-sensitivity pixel 10 as shown in the drawing.

Moreover, a charge reading region for reading the charge of the high-sensitivity pixel 20 onto the vertical transfer channel is also formed in the same manner. For the reading operation in the application of the third phase pulse to the terminal 213, the charge is read onto the vertical transfer channel on the right side of the high-sensitivity pixel 20 as shown in the drawing. For the reading operation in the application of the seventh phase pulse to the terminal 217, the charge is read onto the vertical transfer channel on the left side of the high-sensitivity pixel 20 as shown in the drawing.

Furthermore, a channel stopper is formed between the vertical transfer channels in the same manner as that in the solid-state image pick-up device of FIG. 3. The surrounding portions of a pixel are different from those of FIG. 3. More specifically, the surrounding portions of the pixel are provided on the side where the charge reading region is not provided.

Next, description will be given to the driving operation of the solid-state image pick-up device shown in FIG. 1. Charges stored in the low-sensitivity pixel 10 and the high-sensitivity pixel 20 corresponding to the intensity of a light incident from a field are read separately. First of all, when a reading pulse is superposed on the third and seventh phase vertical transfer pulses, the charge of the high-sensitivity pixel 20 is read onto the vertical transfer channel. Then, the charges are transferred in the vertical transfer channel in response to the vertical transfer pulse and are held in the predetermined region of the horizontal transfer channel. Subsequently, when the horizontal transfer pulse is applied, the held charges are sequentially sent to the output section 50 and a voltage signal 51 corresponding to the amount of the charges is output.

At this time, the charges of the high-sensitivity pixels 20 which are adjacent to each other in the column direction are read onto the different vertical transfer channels from each other and are transferred to the horizontal transfer channels at the same time. In the horizontal transfer of the high-sensitivity pixel 20 in the solid-state image pick-up device of FIG. 1, therefore, output is carried out in order of "GBRGGBRGG-BRG . . . GBRG", for example.

In the case in which the charge of the low sensitivity pixel 10 is to be transferred after the transfer of the charge of the high-sensitivity pixel 20 is ended, the reading pulse is superposed on the first and fifth phase vertical transfer pulses to read the charge of the low-sensitivity pixel 10 onto the vertical transfer channel. Then, the charge thus read is transferred in the vertical transfer channel in response to the vertical transfer pulse in the same manner and is held in the predetermined region of the horizontal transfer channel. When the horizontal transfer pulse is applied, the held charges are sequentially sent to the output section 50 and the voltage signal 51 corresponding to the amount of the charges is output. In this case, the output is carried out through the output section 50 in order of "gbrggbrg . . . gbrg".

In the case in which the charge signal of the low-sensitivity pixel 10 is not required, it is preferably omitted and a next image can be continuously photographed. In dynamic image image-capturing, therefore, a image-capturing interval can be reduced. Moreover, the driving operation of the vertical transfer electrode is carried out in eight phases. Consequently, the transfer charge can be stored in a section having a size of four phases of the vertical transfer electrode. Thus, the width of the charge transfer channel can be reduced.

While the vertical transfer electrode of the solid-state image pick-up device in FIG. 1 has the same structure as that of the conventional solid-state image pick-up device shown in FIG. 3, it can further be simplified. More specifically, the vertical transfer electrodes 211 and 212, 213 and 214, 215 and 216, and 217 and 218 are collected into four electrodes and are driven by vertical transfer pulses having four phases. With such a structure, the smoothness of the vertical transfer is slightly eliminated and the output signal is entirely identical.

Second Embodiment

Figure 2:
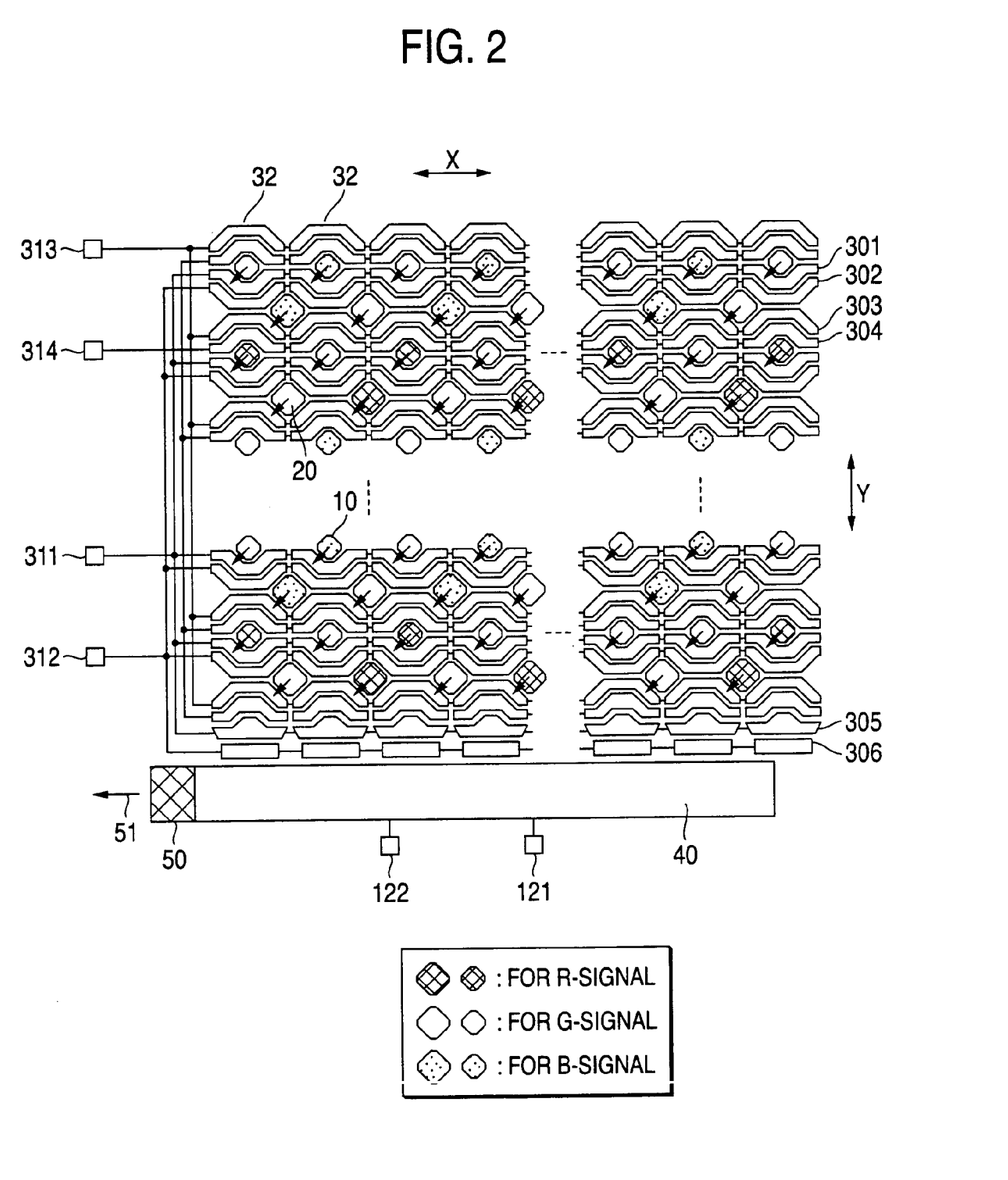
FIG. 2 is a view showing the schematic structure of a solid-state image pick-up device according to a second embodiment.

FIG. 2 shows the schematic structure of a solid-state image pick-up device according to a second embodiment. Since the structures of a plurality of low-sensitivity pixels 10, a plurality of high-sensitivity pixels 20, a horizontal transfer section 40 and an output section 50 in the solid-state image pick-up device of FIG. 2 are the same as those of the solid-state image pick-up device in FIG. 3, description will be omitted.

A vertical transfer section 32 (only a part thereof has the designation in FIG. 2) serves to transfer charges from the low-sensitivity pixel 10 and the high-sensitivity pixel 20 in a column direction Y and includes a plurality of vertical transfer channels (not shown) formed on a semiconductor substrate, a plurality of vertical transfer electrodes 301 to 304 formed to cross each of the vertical transfer channels as seen on a plane, and a charge reading region for reading the charges of the low-sensitivity pixel 10 and the high-sensitivity pixel 20 onto the vertical transfer channels (which are typically shown in an arrow of FIG. 2).

The vertical transfer channels take such a shape as to connect two winding shapes extended wholly in the column direction Y between the low-sensitivity pixel 10 and the high-sensitivity pixel 20, and a region for storing and receiving the charge is partitioned by the vertical transfer electrodes 301 to 304 formed above the vertical transfer channels. The two winding shapes are connected. In FIG. 2, therefore, the vertical transfer channel has such a shape as to surround the low-sensitivity pixel 10. In the case in which the low-sensitivity pixel 10 is formed to have a small area as shown in FIG. 2, the low sensitivity pixel 10 is surrounded. In the case in which the areas of the low-sensitivity pixel 10 and the high-sensitivity pixel 20 are to be equalized, any of the pixels may be surrounded.

The vertical transfer electrodes 301 to 304 are provided corresponding to each of the low-sensitivity pixel 10 and the high-sensitivity pixel 20 (any of them which corresponds to the high-sensitivity pixels for one row has the designation in the drawing) and take a winding shape extended wholly in the row direction X between the low-sensitivity pixel 10 and the high-sensitivity pixel 20 in the same manner as the vertical transfer electrodes 101 to 104 in FIG. 3. Moreover, they are the same as the vertical transfer electrodes 101 to 104 in FIG. 3 in that they are actually formed by conductors having almost equal widths.

Vertical transfer pulses having four phases are applied to the vertical transfer electrodes 301 to 304 through terminals 311 to 314 and the charges of the vertical transfer channels are transferred in the column direction Y. The vertical transfer pulse is also applied to transfer electrodes 305 and 306 between the vertical transfer section 32 and the horizontal transfer section 40, and the charges detected by the low-sensitivity pixel 10 or the high-sensitivity pixel 20 for one row are sent to the horizontal transfer section 40 every cycle of the vertical transfer pulse. The operation for reading the charge to the vertical transfer channel is carried out separately for reading from the low-sensitivity pixel 10 and reading from the high-sensitivity pixel 20. The operation for reading the charge from the low-sensitivity pixel 10 is carried out by superposing a reading pulse on a first phase pulse to be applied immediately after the start of vertical charge transfer (a vertical transfer pulse to be applied to the terminal 311). Moreover, the operation for reading the charge from the high-sensitivity pixel 20 is carried out by superposing a reading pulse on a third phase pulse to be applied immediately after the start of vertical charge transfer (a vertical transfer pulse to be applied to the terminal 313).

One vertical transfer channel is shared for the transfer of the charge of the low-sensitivity pixel 10 surrounded by the vertical transfer channel and the charge of the high-sensitivity pixel 20 adjacent to the vertical transfer channel. Moreover, the same channel stopper as that of the solid-state image pick-up device in FIG. 3 is formed between the vertical transfer channels.

Next, description will be given to the driving operation of the solid-state image pick-up device shown in FIG. 2. Charges stored in the low-sensitivity pixel 10 and the high-sensitivity pixel 20 corresponding to the intensity of a light incident from a field are read separately. First of all, when a reading pulse is superposed on the third phase vertical transfer pulse, the charge of the high-sensitivity pixel 20 is read onto the vertical transfer channel. Then, the charges are transferred in the vertical transfer channel in response to the vertical transfer pulse and are held in the predetermined region of the horizontal transfer channel. Subsequently, when the horizontal transfer pulse is applied, the held charges are sequentially sent to the output section 50 and a voltage signal 51 corresponding to the amount of the charges is output.

At this time, the charges of the high-sensitivity pixels 20 for one row are read onto the respective vertical transfer channels and are transferred to the horizontal transfer channels at the same time. In the high-sensitivity pixel 20 in the solid-state image pick-up device of FIG. 2, therefore, the output is carried out in order of "GRGRGR . . . GR" in the horizontal transfer of an initial stage and the output is carried out in order of "BGBGBG . . . BG" in the horizontal transfer of a next stage, for example.

In the case in which the charge of the low sensitivity pixel 10 is to be transferred after the transfer of the charge of the high-sensitivity pixel 20 is ended, the reading pulse is superposed on the first phase vertical transfer pulse to read the charge of the low-sensitivity pixel 10 onto the vertical transfer channel. Then, the charge thus read is transferred in the vertical transfer channel in response to the vertical transfer pulse in the same manner and is held in the predetermined region of the horizontal transfer channel. Subsequently, when the horizontal transfer pulse is applied, the held charges are sequentially sent to the output section 50 and the voltage signal 51 corresponding to the amount of the charges is output. In this case, the output is carried out in order of "rgrgrg . . . rg" in the horizontal transfer of the initial stage and the output is carried out in order of "gbgbgb . . . gb" in the horizontal transfer of the next stage.

In the case in which the charge signal of the low-sensitivity pixel 10 is not required, it is preferably omitted in the same manner as in FIG. 1 and a next image can be continuously photographed. In dynamic image image-capturing, therefore, a image-capturing interval can be reduced. Moreover, the vertical transfer channel has such a shape as to connect two winding shapes and thus has a great width. Consequently, it is possible to reduce pitches in the row direction X of the low-sensitivity pixel 10 and the high-sensitivity pixel 20.

While the color filters for the high-sensitivity pixel and the low-sensitivity pixel have an RGB subtractive color Bayer array in the above description, it is also possible to employ a checked complementary color filter array having cyan, green, yellow and magenta or a stripe filter. Moreover, it is also possible to use a filter for a color image pick-up device having a three-plate structure in place of the color filter on a pixel device.

Furthermore, it is also possible to obtain an image having a high resolution by eliminating the color filter for the low-sensitivity pixel to utilize the low-sensitivity pixel signal for an interpolation processing.

As is apparent from the above description, according to the invention, it is possible to provide a solid-state image pick-up device capable of efficiently arranging and utilizing a high-sensitivity pixel and a low-sensitivity pixel.

What is claimed is:

1. A solid-state image pick-up device having a plurality of photoelectric converting devices arranged in a row direction and a column direction orthogonal thereto over a surface of a semiconductor substrate, comprising:
   a vertical transfer section for transferring charges from the photoelectric converting devices in the column direction;
   a horizontal transfer section for transferring the charges from the vertical transfer section in the row direction; and
   an output section for outputting a signal corresponding to a charge transferred through the horizontal transfer section,
   wherein the photoelectric converting device includes a plurality of high-sensitivity photoelectric converting devices arranged like a tetragonal grid in the row direction and the column direction orthogonal thereto and serving to carry out a photoelectric conversion having a relatively high sensitivity, and a plurality of low-sensitivity photoelectric converting devices arranged like the tetragonal grid in the row direction and the column direction orthogonal thereto and serving to carry out a photoelectric conversion having a relatively low sensitivity,
   the high-sensitivity photoelectric converting devices and the low-sensitivity photoelectric converting devices are arranged at an equal array pitch in positions shifted by ½ of the array pitch from each other in the row direction and the column direction,
   the vertical transfer section includes a plurality of vertical transfer channels formed on the semiconductor substrate corresponding to the photoelectric converting devices provided in the column direction, a plurality of vertical transfer electrodes formed to cross each of the vertical transfer channels as seen on a plane, and a charge reading regions for reading the charges of the photoelectric converting devices onto the vertical transfer channels,
   each of the vertical transfer channels takes a winding shape extended wholly in the column direction between the photoelectric converting devices,
   each of the vertical transfer electrodes takes a winding shape extended wholly in the row direction between the photoelectric converting devices,
   the charge reading regions of the photoelectric converting devices which are adjacent to each other in the column direction are formed between the adjacent photoelectric converting devices and the vertical transfer channels which are different from each other,
   four vertical transfer electrodes are provided corresponding to one of the photoelectric converting devices adjacent to each other in the column direction,
   other four vertical transfer electrodes are provided corresponding to the other of the photoelectric devices adjacent to each other in the column direction, and the vertical transfer electrodes are driven by vertical transfer pulses having eight phases.

2. The solid-state image pickup device according to claim 1, wherein the charge reading regions of the photoelectric converting devices are formed such that the charges of high-sensitivity photoelectric converting devices for two rows can be simultaneously transferred to the horizontal transfer section, or the charges of low-sensitivity photoelectric converting devices for two rows can be simultaneously transferred to the horizontal transfer section.

3. The solid-state image pick-up device according to claim 1, wherein the charge reading regions of the photoelectric converting devices which are adjacent to each other in the row direction are formed between the adjacent photoelectric converting devices and the vertical transfer channels which are different from each other.

4. A solid-state image pick-up device having a plurality of photoelectric converting devices arranged in a row direction and a column direction orthogonal thereto over a surface of a semiconductor substrate, comprising:

a vertical transfer section for transferring charges from the photoelectric converting devices in the column direction:

a horizontal transfer section for transferring the charges from the vertical transfer section in the row direction; and an output section for outputting a signal corresponding to a charge transferred through the horizontal transfer section, wherein the photoelectric converting device includes a plurality of high-sensitivity photoelectric converting devices arranged like a tetragonal grid in the row direction and the column direction orthogonal thereto and serving to carry out a photoelectric conversion having a relatively high sensitivity, and a plurality of low-sensitivity photoelectric converting devices arranged like the tetragonal grid in the row direction and the column direction orthogonal thereto and serving to carry out a photoelectric conversion having a relatively low sensitivity, the high-sensitivity photoelectric converting devices and the low-sensitivity photoelectric converting devices are arranged at an equal array pitch in positions shifted by ½ of the array pitch from each other in the row direction and the column direction, the vertical transfer section includes a plurality of vertical transfer channels formed on the semiconductor substrate corresponding to the photoelectric converting devices provided in the column direction, a plurality of vertical transfer electrodes formed to cross each of the vertical transfer channels as seen on a plane, and charge reading regions for reading the charges of the photoelectric converting devices onto the vertical transfer channels, each of the vertical transfer channels takes a winding shape extended wholly in the column direction between the photoelectric converting devices, each of the vertical transfer electrodes takes a winding shape extended wholly in the row direction between the photoelectric converting devices, the charge reading regions of the photoelectric converting devices which are adjacent to each other in the column direction are formed between the adjacent photoelectric converting devices and the vertical transfer channels which are different for each other, two vertical transfer electrodes are provided corresponding to one of the photoelectric converting devices adjacent to each other in the column direction, other two vertical transfer electrodes are provided corresponding to the other of the photoelectric converting devices adjacent to each other in the column direction, and the vertical transfer electrodes are driven by vertical transfer pulses having four phases.

5. A solid-state image pick-up device having a plurality of photoelectric converting devices arranged in a row direction and a column direction orthogonal thereto over a surface of a semiconductor substrate, comprising:

a vertical transfer section for transferring charges from the photoelectric converting devices in the column direction;

a horizontal transfer section for transferring the charges from the vertical transfer section in the row direction; and an output section for outputting a signal corresponding to a charge transferred through the horizontal transfer section, wherein the photoelectric converting device includes a plurality of high-sensitivity photoelectric converting devices arranged like a tetragonal grid in the row direction and the column direction orthogonal thereto and serving to carry out a photoelectric conversion having a relatively high sensitivity, and a plurality of low-sensitivity photoelectric converting devices arranged like the tetragonal grid in the row direction and the column direction orthogonal thereto and serving to carry out a photoelectric conversion having a relatively low sensitivity, the high-sensitivity photoelectric converting devices and the low-sensitivity photoelectric converting devices are arranged at an equal array pitch in positions shifted by ½ of the array pitch from each other in the row direction and the column direction, the vertical transfer section includes a plurality of vertical transfer channels formed on the semiconductor substrate corresponding to the photoelectric converting devices provided in the column direction, a plurality of vertical transfer electrodes formed to cross each of the vertical transfer channels as seen on a plane, and charge reading regions for reading the charges of the photoelectric converting device onto the vertical transfer channels, the vertical transfer channel takes such a shape as to connect two winding shapes extended wholly in the column direction between the photoelectric converting devices, the vertical transfer electrode takes a winding shape extended wholly in the row direction between the photoelectric converting devices, the respective vertical transfer channels are shared for the transfer of the charges from the high-sensitivity photoelectric converting devices for one column and the transfer of the charges from the low-sensitivity photoelectric converting devices for another adjacent column, two vertical transfer electrodes are provided corresponding to the high-sensitivity photoelectric converting device for one column, other two vertical transfer electrodes are provided corresponding to the low-sensitivity photoelectric converting device for the other adjacent column, and the vertical transfer electrodes are driven by vertical transfer pulses having four phases.

6. The solid-state image pickup device according to claim 5, wherein the charge reading regions of the photoelectric converting devices are formed such that the charges of high-sensitivity photoelectric converting devices for two rows can be simultaneously transferred to the horizontal transfer section, or the charges of low-sensitivity photoelectric converting devices for two rows can be simultaneously transferred to the horizontal transfer section.

7. The solid-state image pick-up device according to claim 5, wherein the charge reading regions of the photoelectric converting devices which are adjacent to each other in the row direction are formed between the adjacent photoelectric converting devices and the vertical transfer channels which are different from each other.

* * * * *